United States Patent
Koch

(10) Patent No.: US 7,669,615 B2
(45) Date of Patent: Mar. 2, 2010

(54) FABRIC LAYER OF A BELLOWS

(75) Inventor: Robert Koch, Bad Sooden-Allendorf (DE)

(73) Assignee: Hübner GmbH, Kassel (DE)

( * ) Notice: Subject to any disclaimer, the term of this patent is extended or adjusted under 35 U.S.C. 154(b) by 393 days.

(21) Appl. No.: 11/335,133

(22) Filed: Jan. 19, 2006

(65) Prior Publication Data
US 2006/0174958 A1    Aug. 10, 2006

(30) Foreign Application Priority Data
Feb. 8, 2005    (DE)    ........................ 10 2005 005 621

(51) Int. Cl.
*F16L 11/00* (2006.01)
(52) U.S. Cl. ........................ 138/121; 138/122; 138/125; 138/145; 106/18
(58) Field of Classification Search ................ 138/121, 138/122, 118, 119; 396/341; 105/15, 18
See application file for complete search history.

(56) References Cited

U.S. PATENT DOCUMENTS

| | | | | |
|---|---|---|---|---|
| 2,578,111 A | * | 12/1951 | Turner et al. | 138/121 |
| 4,547,053 A | * | 10/1985 | Tobler | 396/341 |
| 4,662,734 A | * | 5/1987 | Nishi | 138/121 |
| 4,860,665 A | * | 8/1989 | Schmidt | 105/18 |
| 4,903,612 A | * | 2/1990 | Sassa et al. | 105/18 |
| 4,984,522 A | * | 1/1991 | Parish | 105/15 |
| 5,033,395 A | * | 7/1991 | Bechu et al. | 105/18 |
| 5,060,578 A | * | 10/1991 | Carimentrand | 105/18 |
| 5,111,752 A | * | 5/1992 | Carimentrand | 105/18 |
| 5,262,092 A | * | 11/1993 | Reeder et al. | 261/35 |
| 5,456,186 A | * | 10/1995 | Hubner | 105/18 |
| 5,487,861 A | * | 1/1996 | Reeder et al. | 264/134 |
| 5,825,461 A | * | 10/1998 | Ruffell | 396/346 |
| 5,953,998 A | * | 9/1999 | Petit | 105/18 |
| 6,085,403 A | * | 7/2000 | Petit | 29/454 |

FOREIGN PATENT DOCUMENTS

| | | |
|---|---|---|
| CH | 346909 | 7/1956 |
| DE | 30 35 159 | 4/1982 |
| DE | 37 07 357 A1 | 3/1987 |
| DE | 37 10 407 A1 | 3/1987 |
| DE | 3613729 A * | 10/1987 |
| DE | 40 07 862 | 3/1990 |
| DE | 40 07 862 A1 | 3/1990 |
| DE | 197 57 429 A1 | 12/1997 |
| DE | 103 24 524 | 7/2004 |
| DE | 102006061503 A1 * | 6/2008 |
| EP | 0 275 365 | 7/1988 |
| EP | 0 544 203 | 6/1993 |

(Continued)

OTHER PUBLICATIONS

EP Search Report EP 06 00 0763 dated May 3, 2006.

*Primary Examiner*—Patrick F Brinson
(74) *Attorney, Agent, or Firm*—Thomas R. Vigil

(57) ABSTRACT

The subject matter of the invention is a fabric layer of a bellows, e.g., of a connection between two hinge-linked vehicles or of an aircraft passenger bridge, the fabric layer being plastically deformed by a force acting on the fabric.

5 Claims, 3 Drawing Sheets

FOREIGN PATENT DOCUMENTS

| | | |
|---|---|---|
| EP | 0 922 621 | 6/1999 |
| RU | 2025193 | 12/1994 |
| RU | 2040613 | 7/1995 |
| RU | 94036132 | 7/1996 |
| RU | 2 971 439 | 1/1997 |
| SU | 639463 | 12/1978 |
| SU | 1643176 | 4/1991 |
| UA | 55 191 | 3/2003 |

\* cited by examiner

FABRIC LAYER OF A BELLOWS

CROSS-REFERENCE TO RELATED APPLICATIONS

This application claims Priority from German Application No. DE 10 2005 005 621.0-21 filed on 8, Feb. 2005.

FIELD OF THE INVENTION

The present invention relates to a fabric layer of a bellows such as a connection between two hinge-linked vehicles or of an aircraft passenger bridge as well as to a bellows having such a fabric layer.

DESCRIPTION OF THE PRIOR ART

Bellows, more specifically those constituting a part of a connection between two vehicle parts, are well known. Said bellows may for example be configured as a pleated or as a corrugated bellows. When configured as a pleated bellows, the discrete pleats are bordered with perimeter frames made of aluminum. Corrugated bellows also have their discrete bellows elements bordered with perimeter aluminum frames. On the one side, these frames serve to connect the discrete pleat or corrugation elements whilst on the other side they also provide the entire bellows with a certain stiffness. Meaning, it is made certain that the bellows will resist sagging too much from its own weight. Moreover, these bordering frames also ensure that the bellows will always recover its initial position after extension.

To manufacture such a bellows material, it is preferred to join together a plurality of fabric layers, the connection being ensured by plastic layers that are provided both between the discrete fabric layers and inside and outside. This plurality of fabric layers effects a relative stiffness of the bellows material. The plastic coating also seals the material. Such type bellows material is usually manufactured using calenders. Said bellows has an own heavy weight due to the double- or multilayered structure of the bellows material. As a result of this own heavy weight, the bellows however tends to sag. This means that here two opposing conditions are to be reconciled, that is to say that on the one side it must be made certain that the bellows material itself has a certain stiffness which, in accordance with prior art, means that the material must be comprised of at least two or more fabric layers but which on the other side means that the bellows material becomes heavier and has a greater tendency to sag as a result thereof.

BRIEF SUMMARY OF THE INVENTION

The subject matter of the invention now is a bellows material for a bellows of the type mentioned herein above that is light in weight but still stiff and that moreover is leakproof.

In accordance with the invention, such a bellows material is characterized in that the fabric layer is plastically deformed by a force acting on the fabric.

A current fabric used for a bellows material has a warp and weft structure. As already explained herein above, at least two such current fabric layers are used to provide such a prior art bellows material. It has however been found out that the plastic deformation of a fabric causes it to become quite stiff. This can be explained by the fact that the deformation causes the threads to fill out the space between the discrete threads so that the overall fabric becomes stiffer. An additional advantage thereof is that as a result of the fabric deformation, for example by a force acting on the top and bottom side thereof, meaning by pressing such a fabric, the spaces between warp and weft are caused to become closer so that a fabric subjected to such a treatment already has a certain basic density. This in turn permits to use smaller quantities of plastic material for coating in order to achieve the desired density, this resulting in weight savings. This in turn reduces the weight of the bellows so that it is prevented from sagging so much.

Plastic threads made for example from polypropylene, polyethylene, polyvinyl chloride, polychloride and the like are used as the material for manufacturing the warp and weft threads of such a fabric to be deformed. However, the prerequisite for using the threads is that they must really be plastically deformable. It has more specifically been found out that the use of monofil threads, that is to say of threads consisting of but one single fiber, may yield good results with regard to the stiffness of a fabric deformed according to the invention and moreover also of fabrics meeting the demands placed on them with respect to density in spite of low plastic coating thickness.

As a result of increased stiffness combined with reduced weight, the need for measures for supporting or stabilizing the bellows is obviated. It has in particular been found out that it is no longer necessary to surround every single pleat or corrugation with a perimeter bordering frame made from aluminum for example, but only every second, third or fourth pleat or corrugation. This brings additional savings in weight and prevents the bellows from sagging.

According to another feature of the invention, the fabric is subjected to thermal treatment, meaning that the threads shrink so that higher closeness of the weave is achieved; densification of the fabric concurrently takes place so that the density is also increased. It may thereby be envisaged to first subject the fabric to such heat shrinkage and then to plastic deformation in the manner described herein above or to first deform it prior to subjecting it next to heat shrinkage.

In order to protect the threads from the outside against environmental impact and also to finally ensure a durable density, there is provided, in accordance with another feature of the invention, that the fabric be provided, at least on its one side, preferably on its outer side, with a plastic coating.

Recapitulating, the following advantages can accordingly be noted for the fabric of the invention:

1. A one-layered fabric manufactured according to the invention already comprises sufficient stiffness and also density so that it is possible to achieve considerable weight savings over a traditional bellows material.
2. A bellows material manufactured in this way is much less expensive than the bellows material consisting of a plurality of fabric layers known from prior art.
3. As a result of its low weight, a bellows manufactured in this way has but little tendency to sag so that the need for measures for supporting the bellows is largely obviated and the bordering profiles in particular can be at least partially eliminated.

Another subject matter of the invention is a bellows configured as a corrugated or a pleated bellows having at least one fabric layer of the type mentioned herein above; it is hereby not necessary to provide each pleat or corrugation with a bordering profile or frame.

BRIEF DESCRIPTION OF THE SEVERAL VIEWS OF THE DRAWING

The invention is described in closer detail by way of example with reference to the drawings.

DETAILED DESCRIPTION OF THE INVENTION

The fabric consists of weft threads 1 and of warp threads 2. Such kind of fabric is well known and needs not be discussed in further detail herein.

There is always a certain distance between the successive weft threads and the warp threads as well even if the weft threads are pushed into place by the reed. This is where the invention comes in. If now the warp and the weft threads are made wider by pressing the fabric, the apertures existing between the weft threads and the warp threads are compulsorily minimized or even eliminated when a direct connection between the threads is achieved. As a result of the plastic deformation of the fabric, the stiffness of the fabric as such is increased as already discussed herein above. The reason therefore substantially is that the spaces between weft and warp are eliminated. By coating a fabric manufactured in this way with a plastic layer on it inner as well as on its outer side, the fabric is not only protected from environmental impact but is also durably sealed.

Figure 1:
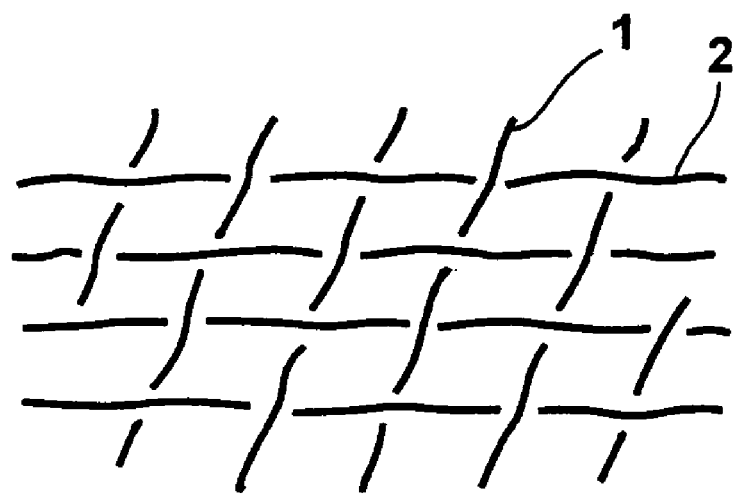
FIG. 1 shows the cloth weave texture of the fabric.
Figure 2:
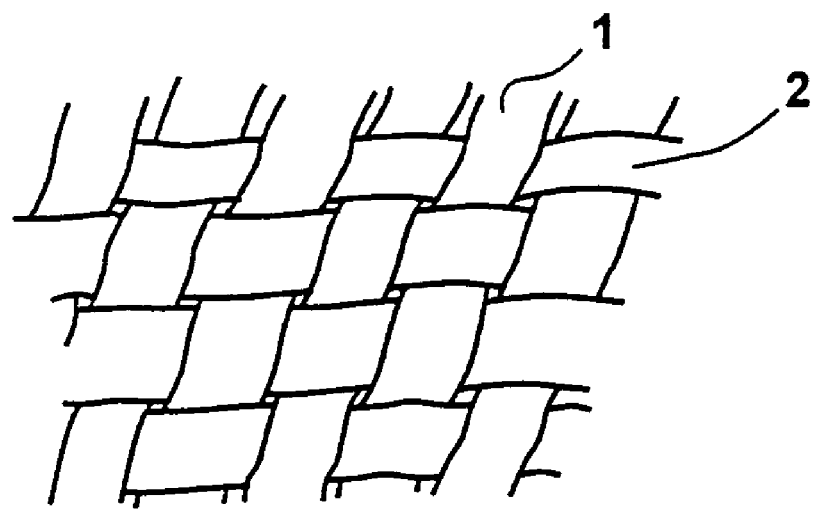
FIG. 2 shows the cloth weave texture of the fabric of FIG. 1, with the fabric having been pressed.
Figure 3:
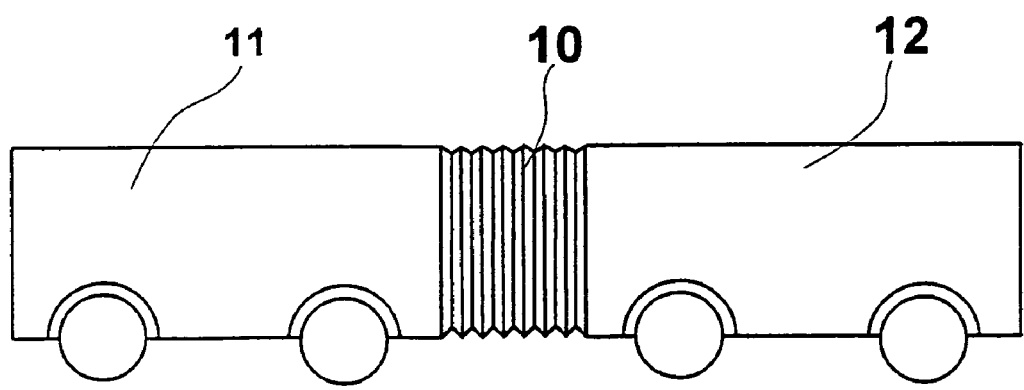
FIG. 3 schematically shows the bellows between two vehicle parts.

FIG. 3 shows an articulated vehicle such as an articulated bus having a bellows 10 between the two vehicle parts 11 and 12.

Figure 4:
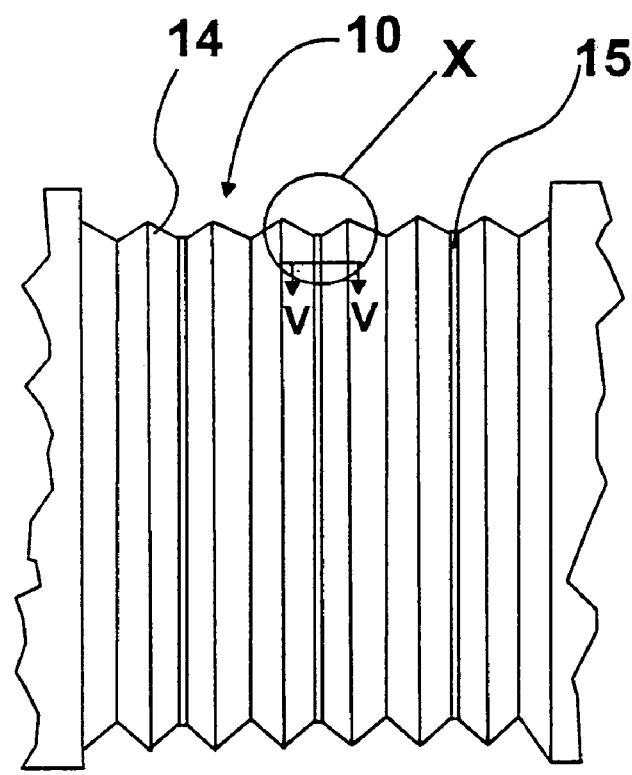
FIG. 4 schematically shows the pleated bellows between the vehicle parts according to FIG. 3 to an enlarged scale.
Figure 5:
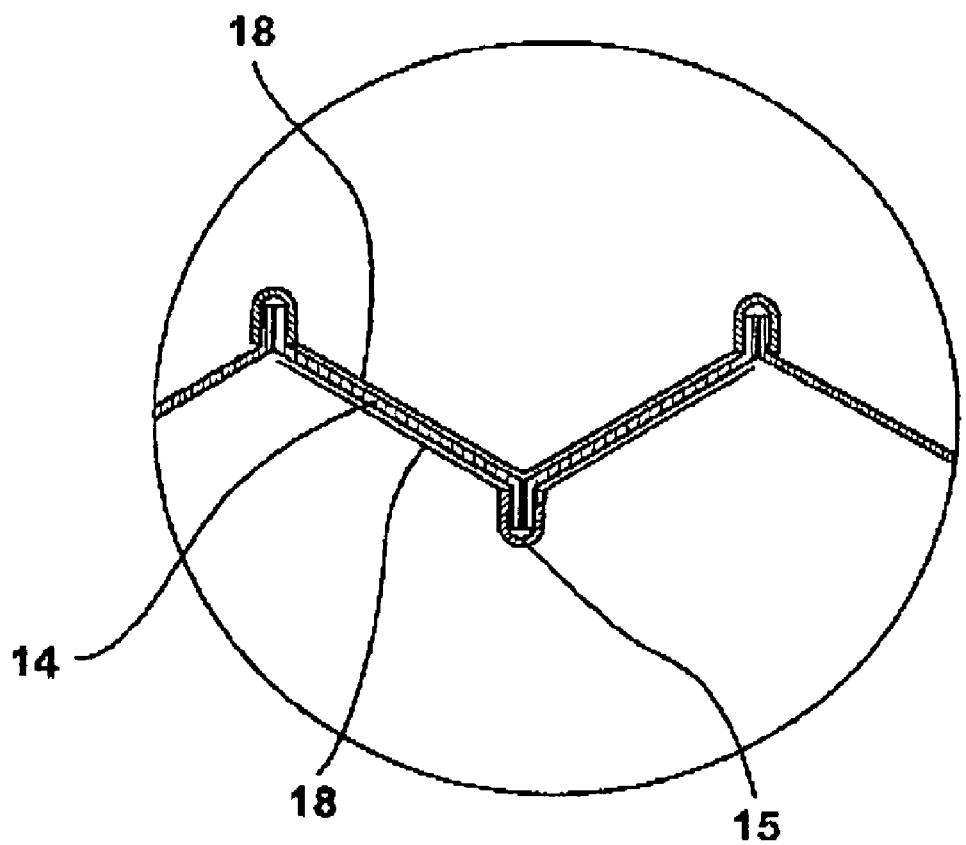
FIG. 5 is a sectional view taken along the line V-V of the detail "X" of FIG. 4 to an enlarged scale.

FIG. 4 shows a detail of a tunnel-shaped pleated bellows with but every third pleat 14 comprising a perimeter bordering frame 15 (FIG. 5).

FIG. 5 shows a coating 18 applied to the pleats 14 after the fabric of the pleats 14 are plastically deformed.

I claim:

1. A bellows used in a connection between two hinge-linked vehicles that is configured to be one of a pleated or a corrugated bellows, with at least one fabric layer which is plastically deformed by a force acting on the fabric layer to such an extent that openings existing between the warp and/or weft threads are substantially closed, the fabric layer made in this way being provided with a plastic layer on one side at least after the fabric layer is plastically deformed.

2. The fabric layer as set forth in claim 1, wherein the warp and/or weft threads are plastically deformable.

3. The fabric layer as set forth in claim 1, wherein the plastic deformation is performed by a force acting on the top and the bottom side of the fabric.

4. The fabric layer as set forth in claim 1, wherein the warp and weft threads are configured to be monofil.

5. The fabric layer as set forth in claim 1 wherein the fabric is subjected to thermal treatment.

\* \* \* \* \*